(12) United States Patent
Sung

(10) Patent No.: US 10,064,159 B1
(45) Date of Patent: Aug. 28, 2018

(54) WIRELESS SIGNAL PROCESSING METHOD AND WIRELESS COMMUNICATION DEVICE

(71) Applicant: ACCTON TECHNOLOGY CORPORATION, Hsinchu (TW)

(72) Inventor: Chien-Fu Sung, New Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 15/951,191

(22) Filed: Apr. 12, 2018

(30) Foreign Application Priority Data

Jan. 31, 2018 (CN) .......................... 2018 1 0092936

(51) Int. Cl.
| | |
|---|---|
| *H04W 24/00* | (2009.01) |
| *H04W 64/00* | (2009.01) |
| *H04W 24/10* | (2009.01) |
| *G01S 5/02* | (2010.01) |
| *G01S 3/20* | (2006.01) |

(52) U.S. Cl.
CPC ......... *H04W 64/006* (2013.01); *G01S 5/0252* (2013.01); *H04W 24/10* (2013.01); *G01S 3/20* (2013.01)

(58) Field of Classification Search
CPC ..... H04W 4/023; H04W 16/28; H04W 36/30; H04W 36/32; H04W 52/245
See application file for complete search history.

(56) References Cited

U.S. PATENT DOCUMENTS

| | | | |
|---|---|---|---|
| 2010/0231473 A1* | 9/2010 | Shtrom ................ | H01Q 1/2291 343/757 |
| 2014/0214427 A1* | 7/2014 | Chao ....................... | G10L 15/30 704/270.1 |
| 2014/0355592 A1* | 12/2014 | Camps .................. | H04W 4/023 370/338 |

* cited by examiner

*Primary Examiner* — Khalid Shaheed
(74) *Attorney, Agent, or Firm* — CKC & Partners Co., Ltd.

(57) ABSTRACT

A wireless signal processing method includes determining, by an wireless communication device, whether a terminal device is in a stationary state or in a moving state according to a plurality of received signal strength indicators (RSSIs); when the terminal device is in the stationary state, determining, by the wireless communication device, whether the RSSIs are in a bimodal distribution; on the condition that the RSSIs are in the bimodal distribution, adjusting a plurality of antenna units in the wireless communication device to be on or off dynamically; and sending, by the wireless communication device, the RSSIs to a location engine to locate the terminal device.

12 Claims, 7 Drawing Sheets

WIRELESS SIGNAL PROCESSING METHOD AND WIRELESS COMMUNICATION DEVICE

RELATED APPLICATIONS

This application claims priority to China Application Serial Number 201810092936.X, filed Jan. 31, 2018, which is herein incorporated by reference.

BACKGROUND

Technical Field

The disclosure relates to a signal processing method and a signal processing device, particularly to a wireless signal processing method and a wireless communication device.

Description of Related Art

With technological development, various terminal devices using Wi-Fi service are increased.

To locate terminal devices via Wi-Fi needs stable and reliable received signal strength indicators (RSSIs) provided by the wireless communication device. However, RSSIs are easily affected by the environment and change, resulting in decreased accuracy of locating.

SUMMARY

One aspect of the present disclosure is a wireless signal processing method including the following steps: determining, by a wireless communication device, whether a terminal device is in a stationary state or in a moving state according to a plurality of received signal strength indicators (RSSIs); on the condition that the terminal device is in the stationary state, determining, by the wireless communication device, whether the RSSIs are in a bimodal distribution; on the condition that the RSSIs are in the bimodal distribution, adjusting the a plurality of antenna units in the wireless communication device to be on or off dynamically; and sending, by the wireless communication device, the RSSIs to a location engine to locate the terminal device.

Another aspect of the present disclosure is a wireless communication device. The wireless communication device includes multiple antenna units and a processor. The plurality of antenna units are configured to communicate with the terminal devices and a location engine and send multiple received signal strength indicators (RSSIs) to the location engine to locate the terminal device. The processor are electrically connected to the antenna units, the processor includes: movement detecting unit and antenna-switching unit. The movement detecting unit is configured to receive the RSSIs to determine whether the terminal device is in a stationary state or in a moving state. The antenna-switching unit is electrically coupled to the movement detecting unit and configured to receive the RSSIs, and adjust the antenna units to be on or off dynamically on the condition that the RSSIs are in a bimodal distribution.

DETAILED DESCRIPTION

The embodiments in the following description are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure.

The following illustrations include exemplary operations, but the operations are not necessarily performed in the order shown. Operations may be added, replaced, changed order, and/or eliminated as appropriate, in accordance with the spirit and scope of various embodiments of the present disclosure.

Figure 1:
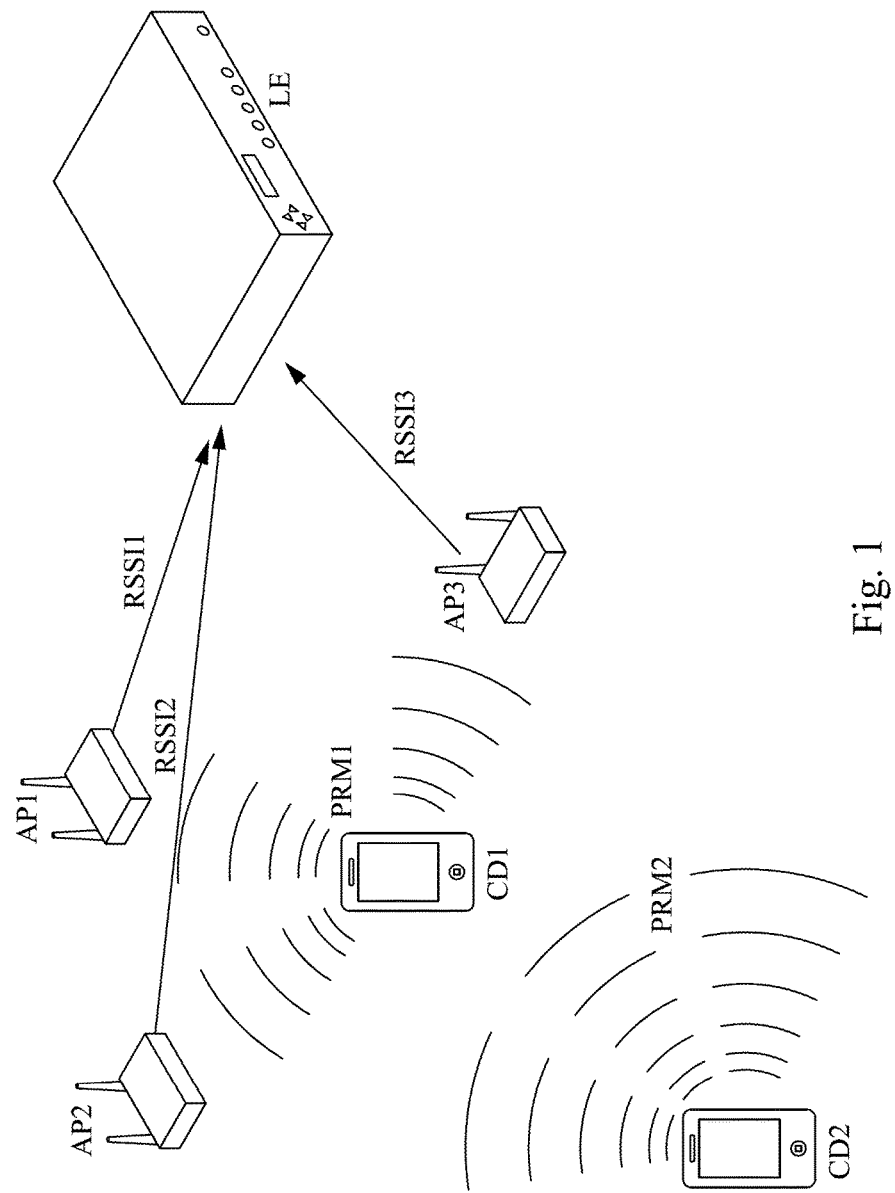
FIG. 1 is a schematic diagram illustrating wireless signal transmitted in accordance with some embodiments of the disclosure.

In order to locate the terminal device via wireless network, a wireless signal processing method is proposed in the present disclosure, in which the wireless signal processing method may be applied to locate various terminal devices, such as a mobile phone, a tablet, a notebook, etc. Please refer to FIG. 1. FIG. 1 is a schematic diagram illustrating wireless signal transmitted in accordance with some embodiments of the disclosure. As shown in FIG. 1, in some embodiments, one or multiple terminal devices CD1, CD2 will broadcast the probe request messages PRM1, PRM2 regularly to seek that is there better Wi-Fi service, whether connected to a wireless communication device AP1, AP2 and AP3 or not. The wireless communication devices AP1, AP2 and AP3 are able to receive the probe request messages PRM1 and PRM2 sent respectively by the terminal devices CD1 and CD2, and accordingly to obtain the corresponding receive signal strength indicators (RSSIs). In some embodiments, the wireless communication device may be realized by a wireless access point, a wireless router, a wireless sharing device or any device capable of connecting mobile devices to wireless network, etc. The above is only an example, and it should not limit the present disclosure.

The wireless communication devices AP1, AP2 and AP3 send the RSSIs received from the different terminal devices CD1 and CD2 to a location engine LE. For example, the wireless communication device AP1, AP2 and AP3 may output RSSI1, RSSI2 and RSSI3 corresponding to the probe request message PRM1 sent from the terminal device CD1 respectively. Accordingly, the location engine LE is able to estimate the distances or the locations of the terminal device CD1 relative to the each of the wireless communication devices AP1, AP2 and AP3 according to the different RSSIs (e.g., RSSI1, RSSI2 and RSSI3) obtained from the same terminal device (e.g., the terminal device CD1) by the different wireless communication devices AP1, AP2 and AP3, to locate the positions of the terminal device CD1.

In some embodiments, the location engine LE may be realized by a server, an AP controller, a router or device capable of processing calculus data.

In addition, though three wireless communication devices AP1, AP2 and AP3, two terminal devices CD1 and CD2 and a location engine are depicted in FIG. 1, the amount is merely by example for the convenience of explanation and not meant to limit the present disclosure.

Figure 2:
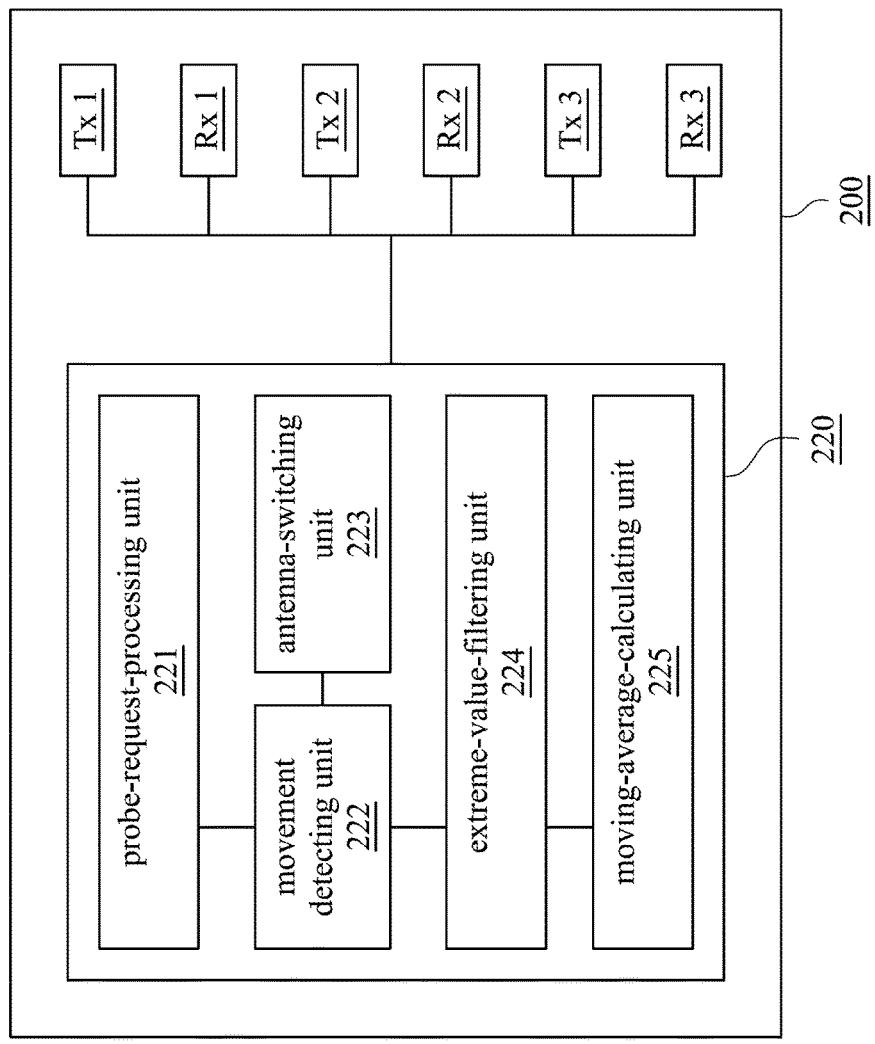
FIG. 2 is a schematic diagram illustrating a wireless communication device in accordance with some embodiments of the disclosure.

Please refer to FIG. 2. FIG. 2 is a schematic diagram illustrating the wireless communication device 200 in accordance with some embodiments of the present disclosure. In some embodiments, the wireless communication device 200 includes a processor 220 and multiple antenna units Tx1, Tx2, Tx3, Rx1, Rx2 and Rx3. In structure, the processor 220 is electrically coupled to the antenna units Tx1, Tx2, Tx3, Rx1, Rx2 and Rx3. Operationally, the antenna units Tx1, Tx2, Tx3, Rx1, Rx2 and Rx3 are configured to communicate with the terminal devices CD1 and CD2, in order to receive or send the wireless signals. The processor 220 is configured to process the wireless signals received by the antenna units Tx1, Tx2, Tx3, Rx1, Rx2 and Rx3.

Specifically, the antenna units Rx1, Rx2 and Rx3 are configured to receive the probe request messages PRM1 and PRM2 sent by the terminal devices CD1 and CD2 and to send to the processor 220. The processor 220 obtains the corresponding RSSIs according to the probe request messages PRM1 and PRM2 and processes the signals. Afterward, the processor 220 sends the RSSIs to the location engine LE by a wireless communication method to locate the terminal devices CD1 and CD2.

Keep referring to FIG. 2. In some embodiments, the processor 220 includes a movement detecting unit 222, an antenna-switching unit 223. In some other embodiments, the processor 220 further includes a probe-request-processing unit 221, an extreme-value-filtering unit 224 and/or a moving-average-calculating unit 225. As shown in FIG. 2, the probe-request-processing unit 221 is electrically coupled to the movement detecting unit 222, the movement detecting unit 222 is electrically coupled to the antenna-switching unit 223 and the extreme-value-filtering unit 224, and the extreme-value-filtering unit 224 is electrically coupled to the moving-average-calculating unit 225. In addition, in the some embodiments, the processor 220 may be realized by a central processing unit (CPU) and/or microprocessor, and each unit in the processor 220 may be realized by an internal computing module, an application-specific integrated circuit (ASIC) or a chip, etc.

Figure 3:
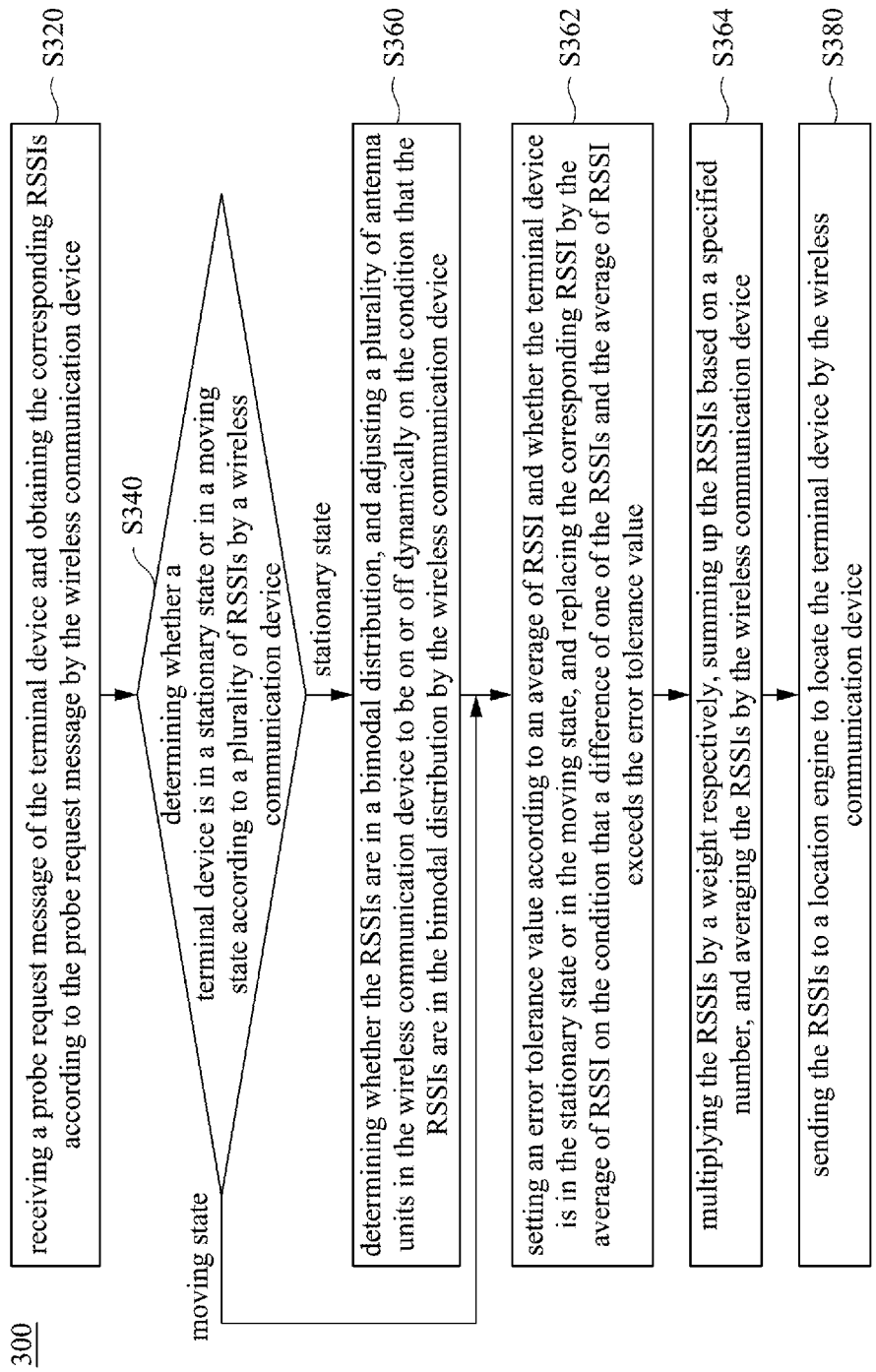
FIG. 3 is flowchart of a wireless signal processing method illustrating a power switch driver in accordance with some embodiments of the disclosure.

For the convenience and clarity of explanation, the specific operation of each unit in the processor 220 will be disclosed with accompanying schematic diagrams for detailed description. Please refer to FIG. 3. FIG. 3 is a flowchart illustrating the wireless signal processing method 300 in accordance with some embodiments of the present disclosure. Firstly, in step S320, the wireless communication device 200 receives the probe request message PRM1 of the terminal device CD1, and obtains the corresponding RSSI according to the probe request message. Specifically, the probe-request-processing unit 221 in the processor 220 receives the probe request message PRM1 sent from the terminal CD1 by the antenna units Rx1, Rx2 and Rx3, and obtains the corresponding RSSI according to the message header of the probe request message, and then sends the RSSI to the movement detecting unit 222.

Next, in the step S340, the wireless communication device 200 determines the terminal device CD1 is in a stationary state or a moving state according to a plurality of RSSIs. If the terminal device CD1 is in the stationary state, than the wireless communication device 200 executes the step S360. If the terminal device CD1 is in the moving state then the step S360 is omitted and the wireless communication device 200 executes the next step.

In the step 340, specifically, in some embodiments, the movement detecting unit 222 sequentially receives the multiple RSSIs obtained from the probe-request-processing unit 221, and the movement detecting unit 222 averages the latest n data of the RSSIs to obtain the average of RSSI, wherein n is a positive integer greater than 1. For example, the movement detecting unit 222 is able to average the latest 5 data of the RSSIs, 43 dBm, 43 dBm, 45 dBm, 47 dBm and 47 dBm, and to obtain the average of RSSI is 45 dBm.

Furthermore, the movement detecting unit 222 sets the variation tolerance value according to the average of RSSI to determine the terminal device CD1 is in the stationary state or the moving state. In some embodiments, the movement detecting unit 222 is able to divide the averages of RSSI into a plurality of regions according to the values of the average of RSSI. As the average of RSSI is in a lower region, a range of the variation tolerance value is smaller. As the average of RSSI is in a higher region, a range of the variation tolerance value is larger.

Figure 4:
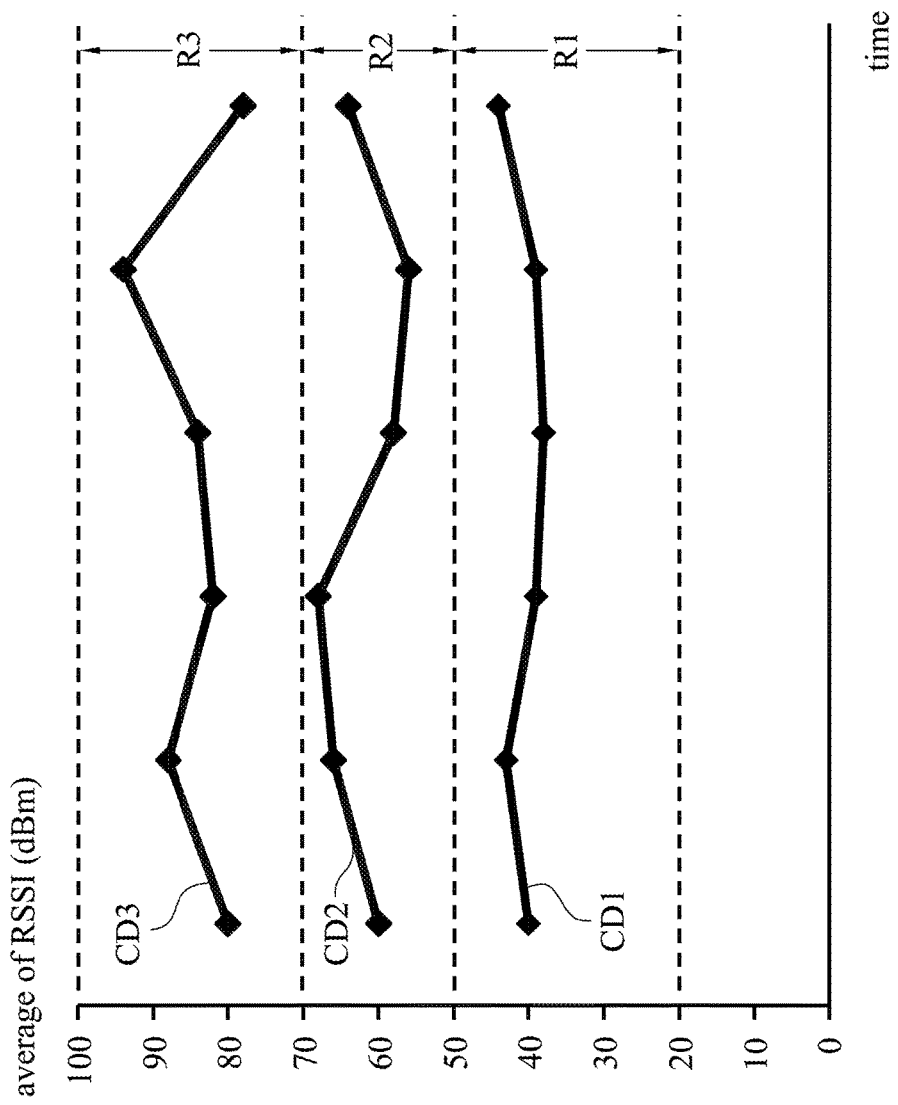
FIG. 4 is an illustrative example of a wireless signal in accordance with some embodiments of the disclosure.

For example, as shown in FIG. 4, the movement detecting unit 222 divides the average of RSSI into three regions R1, R2 and R3. The average of RSSI of the regions of RSSI R1, R2 and R3 is 20~50 dBm, 50~70 dBm and 70~100 dBm respectively. As the average of RSSI corresponding to the terminal device CD1 is in 20~50 dBm (i.e., region of RSSI R1), the movement detecting unit 222 sets the variation tolerance value to be 10 dBm. As the average of RSSI corresponding to the terminal device CD1 is in 50~70 dBm (i.e., region of RSSI R2), the movement detecting unit 222 sets the variation tolerance value to be 15 dBm. And as the average of RSSI corresponding to the terminal device CD1 is 70~100 dBm (i.e., region of RSSI R3), the movement detecting unit 222 sets the variation tolerance value to be 20 dBm.

Figure 5:
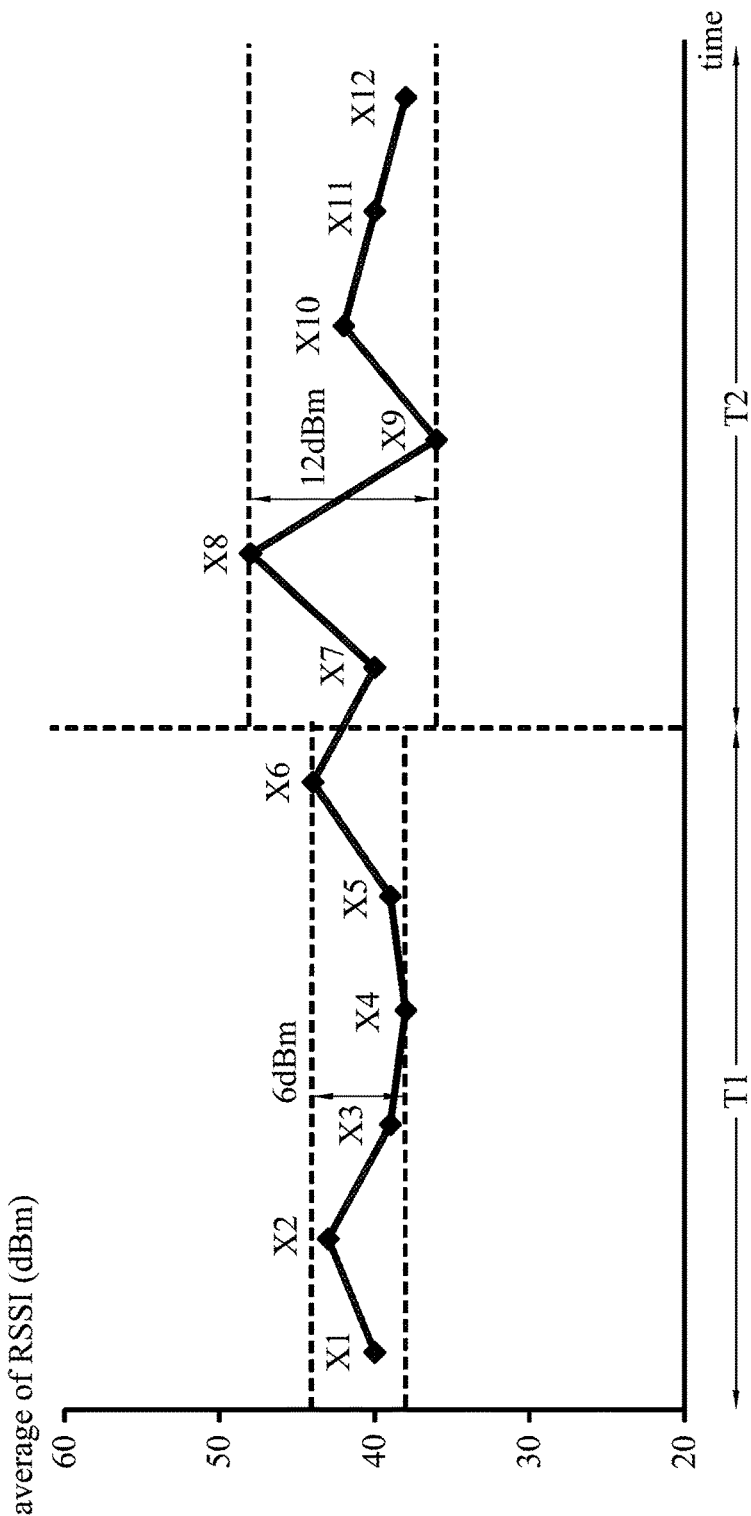
FIG. 5 is an illustrative example of wireless signals in accordance with some other embodiments of the disclosure.

On the condition that the variation of the average of RSSI within a time interval exceeds the variation tolerance value, the movement detecting unit 222 determines that the terminal device is in the moving state, otherwise, on the condition that the variation of the average of RSSI within the time interval is lower than the variation tolerance value, the movement detecting unit 222 determines that the terminal device is in the stationary state. For example, as shown in FIG. 5, in some embodiments, the averages of RSSI X1~X12 in order are 40, 43, 39, 38, 39, 44, 40, 48, 36, 42, 40 and 38 dBm. Since the averages of RSSI X1~X12 are in the region of 20~50 dBm, the movement detecting unit 222 sets the variation tolerance value is 10 dBm. During the T1 interval, in the averages of RSSI X1~X6, the difference between the maximum value X6 (e.g., 44 dBm) and the minimum value X4 (e.g., 38 dBm) is 6 dBm, which lower than the variation tolerance value 10 dBm, so that the movement detecting unit 222 determines the corresponding terminal device is in the stationary state. On the other hand, during the T2 interval, in the averages of RSSI X7~X12, the difference between the maximum value X8 (e.g., 48 dBm) and the minimum value X9 (e.g., 36 dBm) is 12 dBm, which exceeds the variation tolerance value 10 dBm, so that the movement detecting unit 222 determines the corresponding terminal device is in the moving state.

It should be noted that the values of the region of RSSI R1~R3, the average of RSSI X1~X12, the time interval T1, T2 depicted above are merely by example for the convenience of explanation, and not meant to limit the present disclosure. One skilled in the art may arrange proper values of the region of the average of RSSI, the variation tolerance value and the time interval based on actual needs in order to satisfy the requirement.

On the condition that the terminal device CD1 is determined to be in the stationary state in the step S340, the step S360 is executed. In the step S360, the wireless communication device 200 determines whether the RSSIs corresponding to the terminal device CD1 are in a bimodal distribution. On the condition that the RSSIs are in the bimodal distribution, the wireless communication device 200 adjusts the plurality of antenna units in the wireless communication device 200 to be on or off dynamically.

Specifically, in the step S360, the antenna-switching unit 223 of the wireless communication device 200 receives these RSSIs, and determines whether the RSSIs corresponding to the terminal device CD1 are in the bimodal distribution according to whether the numbers of these RSSIs concentrated in two distinct ranges are similar.

Figure 6:
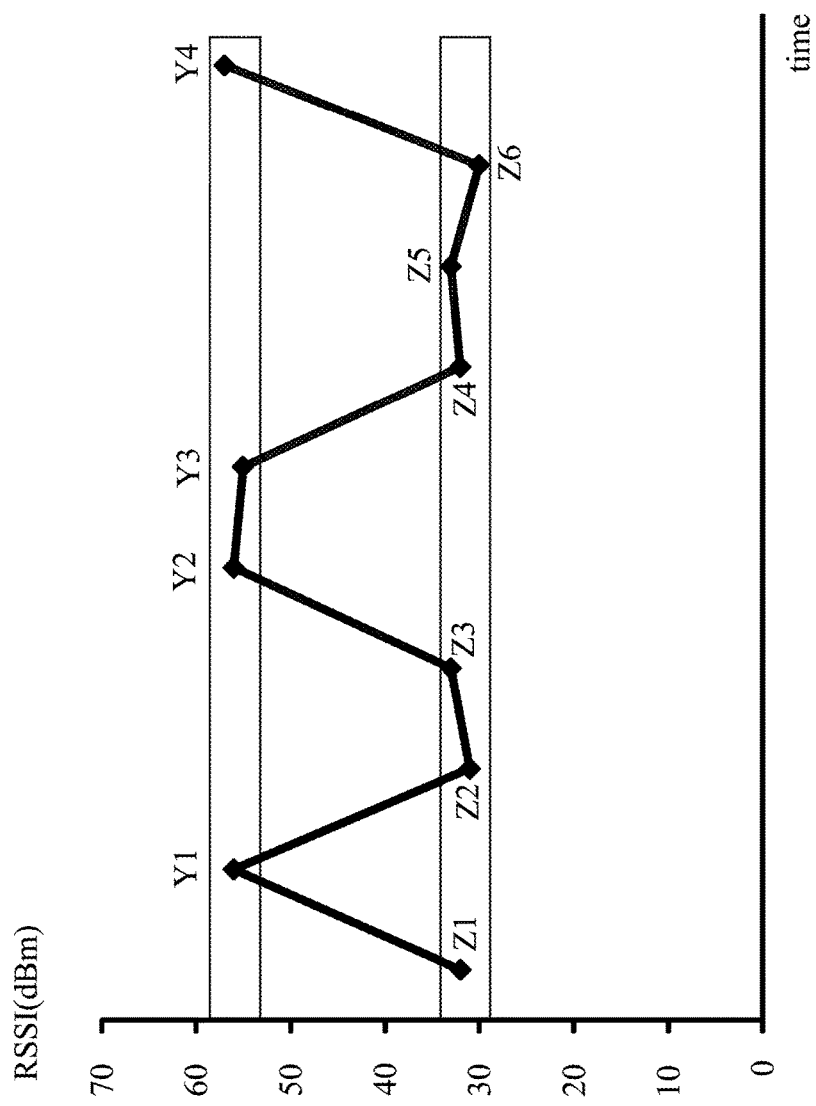
FIG. 6 is an illustrative example of wireless signals in accordance with some other embodiments of the disclosure.

Please refer to FIG. 6. FIG. 6 is a illustrative example of the wireless signals in accordance with some embodiments of the present disclosure. As shown in FIG. 6, for example, in an embodiment, the antenna-switching unit 223 receives 10 RSSIs, Z1, Y1, Z2, Z3, Y2, Y3, Z4, Z5, Z6 and Y4, which in order are 32, 56, 31, 33, 56, 55, 32, 33, 30, 57 dBm, in which six RSSIs Z1~Z6 are about 32 dBm, and four RSSIs Y1~Y4 are about 56 dBm. The antenna-switching unit 223 determines that the RSSIs Z1~Z6 and Y1~Y4 corresponding to the terminal device CD1 are in the bimodal distribution according to the numbers of these RSSIs concentrated in about 32 dBm and 56 dBm are similar numbers, six and four.

On the condition that the RSSIs are in the bimodal distribution, next, the antenna-switching unit 223 are configured to switch the multiple antenna units Tx1, Tx2, Tx3, Rx1, Rx2 and Rx3 to be on or off dynamically according to an operating mode of the wireless communication device 200. For example, in some embodiments, on the condition that RSSIs Z1~Z6 and Y1~Y4 are in the bimodal distribution, if the operating mode of the wireless communication device 200 is a pure location mode without providing Wi-Fi service, the antenna-switching unit 223 turns off all the transmitting-antenna unit Tx1, Tx2 and Tx3 and some receiving-antenna unit Rx2, Rx3, and merely turns on the receiving-antenna unit Rx1. On the other hand, for another example, on the condition that RSSIs Z1~Z6 and Y1~Y4 are in the bimodal distribution, if the operating mode of the wireless communication device 200 is a location priority mode with providing location services and Wi-Fi services at the same time, the antenna-switching unit 223 turns off some transmitting-antenna units Tx2, TX3 and some receiving-antenna units Rx2, Rx3, and turns on the other transmitting-antenna unit Tx1 and receiving-antenna unit Rx1. Furthermore, on the condition that the RSSIs Z1~Z6 and Y1~Y4 are in the bimodal distribution, if the operating mode of the wireless communication device 200 is a Wi-Fi priority mode with providing location services and Wi-Fi services at the same time, the antenna-switching unit 223 turns off the transmitting-antenna unit Tx3, and turns on the other transmitting-antenna units Tx2, Tx3 and receiving-antenna units Rx1, Rx2 and Rx3. Through adjusting the antenna units to be on or off dynamically to find the antenna units that leads to the bimodal distribution, so as to eliminate the bimodal distribution caused by the transmission and reception of the specific antenna units and improve the accuracy of transmitting and receiving signals.

In some other embodiments, as shown in FIG. 3, on the condition that the terminal device CD1 are determined to be in the moving state, the step S360 is omitted and the next step is executed. In some embodiments, on the condition that the terminal device CD1 are in the moving state, the step S362 is executed. In the step S362, the wireless communication device 200 sets the error tolerance value according to the average of RSSI and whether the terminal device CD1 is in the stationary state or the moving state, and as a difference between one of the RSSIs and the average of RSSI exceeds the error tolerance value, the wireless communication device 200 replaces the corresponding RSSI with the average of RSSI.

Please refer to FIG. 2 and FIG. 3 together. Specifically, the extreme-value-filtering unit 224 in the processor 220 is configured to set the error tolerance value according to the average of RSSI obtained by the movement detecting unit 222 and whether the terminal device CD1 is in the stationary state or the moving state determined by the movement detecting unit 222. In some embodiments, as the average of RSSI is larger, the error tolerance value set by the extreme-value-filtering unit 224 is larger. On the contrary, as the average of RSSI is smaller, the error tolerance value set by the extreme-value-filtering unit 224 is smaller. If the averages of RSSI are similar, as the terminal device CD1 is in the moving state, the error tolerance value set by the extreme-value-filtering unit 224 is larger. On the contrary, as the terminal device D1 is in the stationary state, the error tolerance value set by the extreme-value-filtering unit 224 is smaller.

For example, if the average of RSSI is in the region of 20~50 dBm, as the terminal device CD1 is in the stationary state, the extreme-value-filtering unit 224 sets the error tolerance value to be 10 dBm, and as the terminal device CD1 is in the moving state, the extreme-value-filtering unit 224 sets the error tolerance value to be 25 dBm. If the average of RSSI is in the region of 50~70 dBm, as the terminal device CD1 is in the stationary state, the extreme-value-filtering unit 224 sets the error tolerance value to be 15 dBm, and as the terminal device CD1 is in the moving state, the extreme-value-filtering unit 224 sets the error tolerance value to be 30 dBm. If the average of RSSI is in the region of 70~100 dBm, as the terminal device CD1 is in the stationary state, the extreme-value-filtering unit 224 sets the error tolerance value to be 20 dBm, and as the terminal device CD1 is in the moving state, the extreme-value-filtering unit 224 sets the error tolerance value to be 35 dBm.

It should be noted that the values of the region of the average of RSSI and the error tolerance value depicted above are merely by example for the convenience of explanation, and not meant to limit the present disclosure. One skilled in the art may arrange proper values of the region of the average of RSSI, the error tolerance value based on actual needs in order to satisfy the requirement.

Figure 7:
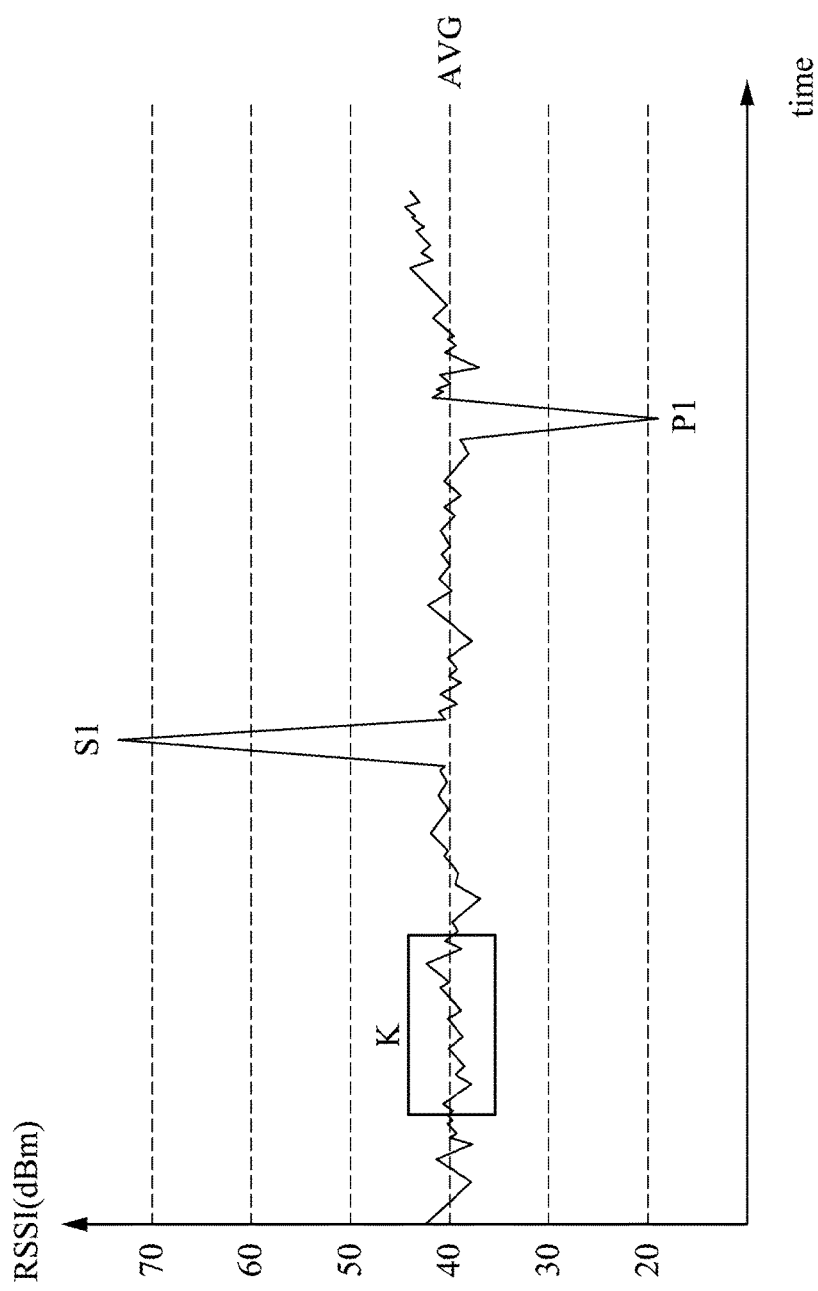
FIG. 7 is an illustrative example of wireless signals in accordance with some other embodiments of the disclosure.

Furthermore, on the condition that the difference between one of the RSSI received and the average of RSSI obtained by the movement detecting unit 222 exceeds the error tolerance value set above, the extreme-value-filtering unit 224 replaces the corresponding RSSI with the average of RSSI. For example, as shown in FIG. 7, the terminal device CD1 is in the stationary state, the average of RSSI AVG obtained by the movement detecting unit 222 is about 40 dBm, and the error tolerance value set by the extreme-value-filtering unit 224 is 10 dBm, i.e., the allowable range of error is 30~50 dBm. If one of the RSSI (e.g., RSSI S1) received by the extreme-value-filtering unit 224 is about 75 dBm, than the difference between the RSSI S1 and the average of RSSI AVG is 35 dBm, which exceeds the error tolerance value 10 dBm, so that the extreme-value-filtering unit 224 determines that the RSSI S1 is a surge, and replaces the RSSI S1 with the average of RSSI AVG.

As shown in FIG. 7 again, if one of RSSIs (e.g., RSSI P1) received by the extreme-value-filtering unit 224 is about 20 dBm, than the difference between the RSSI P1 and the average of RSSI AVG is about 20 dBm, which exceeds the error tolerance value 10 dBm, so that the extreme-value-filtering unit 224 determines the RSSI P1 as a pit, and replaces the RSSI P1 with the average of RSSI AVG. Through the above further for setting different error tolerance value according to different states and different RSSI, in order to reduce the interference or noise toward the phenomenon of the surge or the pit generated by the received RSSI.

It should be noted that the values of the average of RSSI AVG, RSSI S1 and P1 depicted above are merely by example for the convenience of explanation, and not meant to limit the present disclosure. One skilled in the art may arrange proper tolerance values of the error based on actual needs in order to satisfy the requirement.

Keep referring to FIG. 3. As shown in FIG. 3, next, a step S364 is executed. In the step S364, the wireless communication device 200 further performs an averaging operation on the processed RSSIs according to a specified number of times.

In the step S364, specifically, please refer to FIG. 2 and FIG. 3 together, the moving-average-calculating unit 225 in the processor 220 is configured to perform the averaging operation on the received RSSI according to the specified number of times. For example, as shown in FIG. 7, the moving-average-calculating unit 225 takes 10 data K in the RSSIs received from the terminal device CD1 to perform the averaging operation.

In some other embodiments, the moving-average-calculating unit 225 is further configured to multiply the RSSIs by the different weights respectively, and to add the RSSIs multiplied by the different weights, and to perform the averaging operation. Specifically, the moving-average-calculating 225 takes 10 RSSIs K from the RSSIs received by the terminal device CD1, and multiples the first to tenth RSSIs K that are closer to the current time by the decreasing different weights in order, and sums them up to perform the average operation. For example, the weights in order are 5, 5, 4, 4, 3, 3, 2, 2, 1 and 1. In other words, the averaging operation performed in the step S364 may be performed by taking the same or the different weights based on actual needs. Similarly, it should be noted that, the values of weights depicted above are merely by example for convenience of explanation and not meant to limit the present disclosure. One skilled in the art may arrange proper weights based on actual needs. Through the processing of moving-averaging and dynamic weights, the spur phenomenon of smaller variation in the received signals is able to be inhibited.

Please refer to FIG. 3. As shown in FIG. 3, next, enters the step S380. In the step S380, the wireless communication device 200 sends the RSSIs to the location engine LE, so as to locate the terminal device CD1.

Specifically, the wireless communication device 200 sends to the location engine LE the RSSIs with the mac addresses of the corresponding different terminal devices CD1 or CD2 and the coordinate position of the wireless communication device 200 itself by the wireless communication method. For example, the wireless communication device AP1 sends to the location engine LE the RSSIs of the terminal device CD1, the mac address (e.g., 00:12:cf:11:22:33) of the terminal device CD1 and the coordinate position (e.g., 30,05) of the wireless communication device AP1. For another example, the wireless communication device AP2 sends to the location engine LE the RSSIs of the terminal device CD2, the mac address (e.g., 00:11:22:55:66:77) of the terminal device CD2 and the coordinate position (e.g., 10,02) of the wireless communication device AP2.

It should be noted that, in some embodiments, the step S362 or the step S364 may be skipped in the wireless signal processing method 300, and the step S380 is executed directly.

The wireless signal processing method 300 depicted above is described in accompanying with the embodiments shown in FIG. 1 and FIG. 2, but not meant to limit thereto. Various alterations and modifications may be performed on the disclosure by those of ordinary skilled in the art without departing from the principle and spirit of the disclosure. Thus, the protective scope of the disclosure shall be defined by the appended claims.

In the foregoing, exemplary steps are included. However, these steps do not need to be performed sequentially. The steps mentioned in the embodiment may be adjusted according to actual needs unless the order is specifically stated, and may even be performed simultaneously or partially simultaneously.

Furthermore, each of the above embodiments may be implemented by various types of digital or analog circuits or by different integrated circuit chips. Individual components may also be integrated into a single control chip. Various control circuits may also be implemented by various processors or other integrated circuit chips. The above is only an example, and it should not limit the present disclosure.

In summary, in various embodiments of the present disclosure, setting corresponding different magnitudes of tolerance values according to different region of RSSI, and determining the terminal device is in the stationary state or the moving state, and processing the signals according to different condition, so that the wireless communication device is able to process the RSSIs by the wireless signal processing method, to improve the efficiency and accuracy when locating the terminal devices.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A wireless signal processing method, comprising:
   determining, by a wireless communication device, whether a terminal device is in a stationary state or in a moving state according to a plurality of received signal strength indicators (RSSIs);
   on the condition that the terminal device is in the stationary state, determining, by the wireless communication device, whether the RSSIs are in a bimodal distribution;
   on the condition that the RSSIs are in the bimodal distribution, adjusting a plurality of antenna units in the wireless communication device to be on or off dynamically; and
   sending, by the wireless communication device, the RSSIs to a location engine to locate the terminal device.

2. The wireless signal processing method of claim 1, wherein the operation of determining, by the wireless communication device, whether the terminal device is in the stationary state or in the moving state, comprises:
  averaging the latest n data of the RSSIs to obtain an average of RSSI, wherein n is a positive integer greater than 1;
  setting a variation tolerance value according to the average of RSSI;
  on the condition that the variation of the average of RSSI within a time interval exceeds the variation tolerance value, determining that the terminal device is in the moving state; and
  on the condition that the variation of the average of RSSI within the time interval is lower than the variation tolerance value, determining that the terminal device is in the stationary state.

3. The wireless signal processing method of claim 1, wherein the operation of adjusting the antenna units of the wireless communication device to be on or off dynamically further comprises:
  switching one or more antenna units of the antenna units to be on or off selectively based on an operating mode of the wireless communication device.

4. The wireless signal processing method of claim 1, further comprising:
  setting an error tolerance value according to an average of RSSI and whether the terminal device is in the stationary state or in the moving state; and
  on the condition that a difference of one of the RSSIs and the average of RSSI exceeds the error tolerance value, replacing the corresponding RSSI by the average of RSSI.

5. The wireless signal processing method of claim 1, further comprising:
  multiplying the RSSIs by a weight respectively, summing up the RSSIs based on a specified number, and averaging the RSSIs, by the wireless communication device, and then sending the averaged RSSIs to the location engine to locate the terminal device.

6. The wireless signal processing method of claim 1, further comprising:
  receiving, by the wireless communication device, a probe request message of the terminal device and obtaining the corresponding RSSIs according to the probe request message.

7. A wireless communication device, comprising:
  a plurality of antenna units configured to communicate with a terminal device and a location engine, and send a plurality of received signal strength indicators (RSSIs) to the location engine to locate the terminal device; and
  a processor electrically connected to the antenna units, wherein the processor comprises:
    a movement detecting unit configured to receive the RSSIs to determine whether the terminal device is in a stationary state or in a moving state; and
    an antenna-switching unit electrically coupled to the movement detecting unit, and configured to receive the RSSIs and adjust the antenna units to be on or off dynamically on the condition that the RSSIs are in a bimodal distribution.

8. The wireless communication device of claim 7, wherein the movement detecting unit is further configured to average the latest n data of the RSSIs to obtain an average of RSSI, and to set a variation tolerance value according to the average of RSSI, where n is a positive integer greater than 1;
  wherein on the condition that the variation of the average of RSSI within a time interval exceeds the variation tolerance value, the movement detecting unit determines that the terminal device is in the moving state, and on the condition that the variation of the average of RSSI within the time interval is lower than the variation tolerance value, the movement detecting unit determines that the terminal device is in the stationary state.

9. The wireless communication device of claim 7, wherein the antenna-switching unit is further configured to switch one or more antenna units of the antenna units to be on or off selectively according to an operating mode of the wireless communication device.

10. The wireless communication device of claim 7, wherein the processor further comprises an extreme-value-filtering unit electrically coupled to the movement detecting unit and configured to set an error tolerance value respectively according to an average of RSSI and whether the terminal device is in the stationary state or in the moving state; and
  wherein on the condition that the difference of one of the RSSIs and the average of RSSI exceeds the error tolerance value, the extreme-value-filtering unit replaces the corresponding RSSI with the average of RSSI.

11. The wireless communication device of claim 7, wherein the processor further comprises a moving-average-calculating unit electrically coupled to the antenna-switching unit and configured to multiply the RSSIs by a weight respectively, and sum up and average the RSSIs based on a specified number, and then send the averaged RSSIs to the location engine to locate the terminal device.

12. The wireless communication device of claim 7, wherein the processor further comprises a probe-request-processing unit configured to receive a probe request message of the terminal device and obtain the corresponding RSSI according to the probe request message.

* * * * *